(12) United States Patent
Kameyama et al.

(10) Patent No.: US 7,139,832 B2
(45) Date of Patent: Nov. 21, 2006

(54) DATA TRANSFER AND INTERMISSION BETWEEN PARENT AND CHILD PROCESS

(75) Inventors: Shin Kameyama, Kodaira (JP);
Toshiaki Tarui, Sagamihara (JP);
Tsuneyuki Imaki, Kokubunji (JP);
Shinichi Kawamoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 495 days.

(21) Appl. No.: 09/940,506

(22) Filed: Aug. 29, 2001

(65) Prior Publication Data

US 2002/0065934 A1     May 30, 2002

(30) Foreign Application Priority Data

Nov. 27, 2000   (JP)   ............................. 2000-364542

(51) Int. Cl.
   *G06F 15/16*   (2006.01)
(52) U.S. Cl. ...................................... 709/237; 709/219
(58) Field of Classification Search ................ 709/219, 709/237, 203; 718/104; 719/331; 370/313; 707/10; 717/164
See application file for complete search history.

(56) References Cited

U.S. PATENT DOCUMENTS

| | | | | |
|---|---|---|---|---|
| 5,325,530 A * | 6/1994 | Mohrmann | ................. | 717/124 |
| 5,444,766 A * | 8/1995 | Farwell et al. | ............... | 455/437 |
| 5,717,926 A * | 2/1998 | Browning et al. | .......... | 718/104 |
| 5,721,876 A * | 2/1998 | Yu et al. | ....................... | 703/27 |
| 5,860,020 A * | 1/1999 | Van Venrooy et al. | ........ | 712/28 |
| 5,867,789 A * | 2/1999 | Olds et al. | ................... | 455/453 |
| 5,909,681 A * | 6/1999 | Passera et al. | ................. | 707/8 |
| 5,930,511 A * | 7/1999 | Hinsley | ....................... | 717/164 |
| 6,111,894 A * | 8/2000 | Bender et al. | .............. | 370/469 |
| 6,167,363 A * | 12/2000 | Stapleton | ..................... | 703/14 |
| 6,170,018 B1 * | 1/2001 | Voll et al. | ..................... | 719/330 |
| 6,216,127 B1 * | 4/2001 | Gans et al. | ................... | 707/10 |
| 6,247,041 B1 * | 6/2001 | Krueger et al. | ............. | 718/104 |
| 6,311,265 B1 * | 10/2001 | Beckerle et al. | ............. | 712/203 |
| 6,314,567 B1 * | 11/2001 | Oberhauser et al. | ........ | 717/170 |
| 6,393,459 B1 * | 5/2002 | Lurndal | ....................... | 709/203 |
| 6,424,833 B1 * | 7/2002 | Iizuka et al. | ................. | 455/436 |
| 6,424,988 B1 * | 7/2002 | Lurndal | ....................... | 718/106 |
| 6,430,164 B1 * | 8/2002 | Jones et al. | .................. | 370/313 |

(Continued)

OTHER PUBLICATIONS

Steven H. Rodrigues, Thomas E. Anderson, David E. Culler, "High-Performance Local Area Communication With Fast Sockets", Computer Science Division, University of California at Berkley, pp. 1-9.

*Primary Examiner*—Rupal Dharia
*Assistant Examiner*—Kristie D. Shingles
(74) *Attorney, Agent, or Firm*—Reed Smith LLP; Stanley P. Fisher, Esq.; Juan Carlos A. Marquez, Esq.

(57) ABSTRACT

A data transfer method realizing a function similar to Unix's FORK by the following operations: allowing a parent process on a server to issue a request for intermission of communication to a process on a client and allowing the process on the client to issue a report of completion of intermission; allowing the parent process to issue, to a child process created on the server and the process on the client, a request for establishment of a new communication line connection between them; and, if the parent process has received data from the process on the client before the establishment of the new connection, coping the data to the child process.

3 Claims, 8 Drawing Sheets

U.S. PATENT DOCUMENTS

| | | | |
|---|---|---|---|
| 6,434,594 B1 * | 8/2002 | Wesemann | 709/201 |
| 6,609,159 B1 * | 8/2003 | Dukach et al. | 719/331 |
| 6,650,342 B1 * | 11/2003 | Lim | 345/736 |
| 6,769,119 B1 * | 7/2004 | England et al. | 718/100 |
| 6,801,938 B1 * | 10/2004 | Bookman et al. | 709/224 |
| 6,947,435 B1 * | 9/2005 | Chikuma et al. | 370/412 |
| 6,976,258 B1 * | 12/2005 | Goyal et al. | 718/104 |

* cited by examiner

DATA TRANSFER AND INTERMISSION BETWEEN PARENT AND CHILD PROCESS

BACKGROUND OF THE INVENTION

1. Field of the Invention

This invention relates to a data transfer method including fork emulation in TCP/IP socket communication, and particularly to a data transfer method by which a child process created by a fork takes over the network connection between the parent process and client in a data processing system which performs data transfer between user-spaces without any operating system involvement.

2. Description of Related Art

Figure 2:
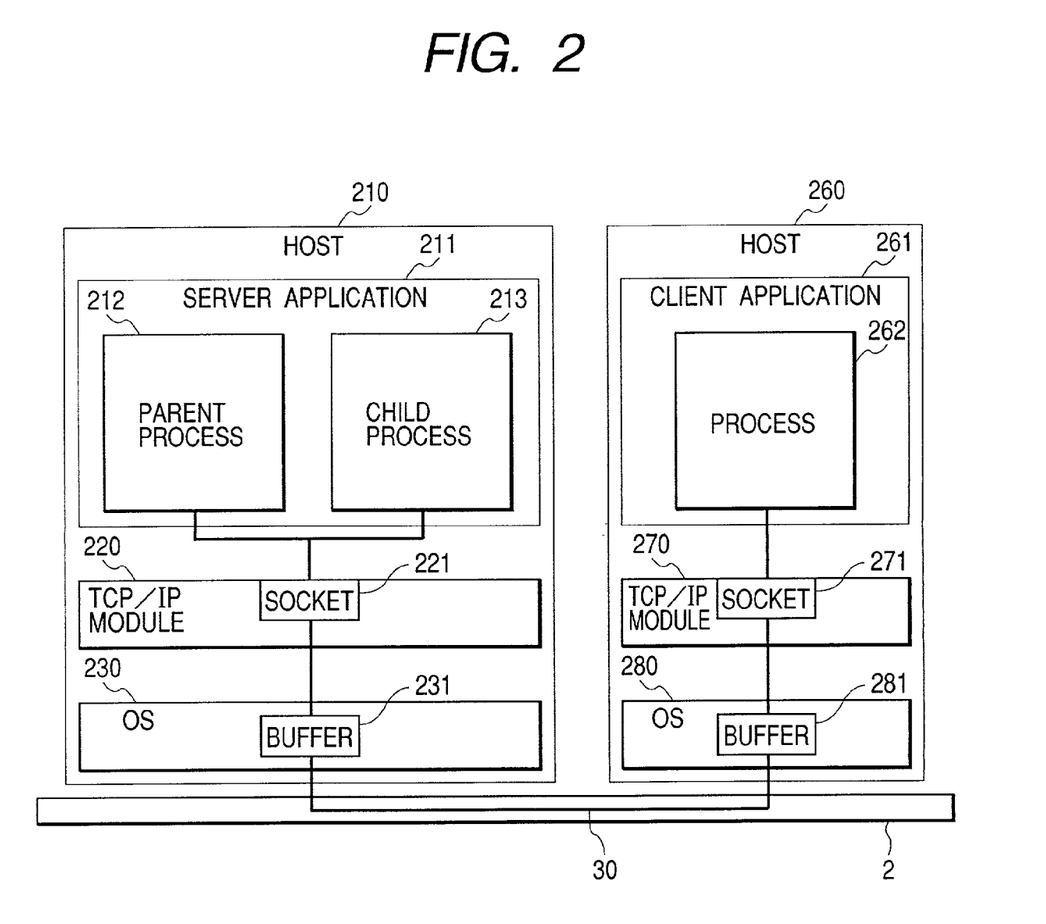
FIG. 2 is a conceptual diagram showing a typical TCP/IP socket communication.

In a distributed data processing system of the server-client model, TCP/IP socket communication is very common and there exist enormous software assets. FIG. 2 shows an example of a data processing system of the server-client model. In this example, a host 210 and a host 260 are connected by a communication line 30 and a server application 211 and a client application 261 communicate with each other via sockets.

In the conventional socket communication method, when a parent process 212 in the server application 211 receives a request from a process 262 in the client application 261, the parent process 212 creates a child process 213 through UNIX's fork function and the child process 213 deals with the request from the process 262. In socket communication, however, data to be communicated is once buffered in buffers inside the space of an operating system (a buffer 231 in an OS 230 and a buffer 281 in an OS 280). This has been a bottleneck in improving the throughput.

As a solution to this problem, next-generation high speed IO methods, such as VIA (Virtual Interface Architecture) which enables direct data transfer between user-spaces without the need for copying into the OS space, have been proposed in recent years. One example of such known art is "High-Performance Local Area Communication With Fast Socket" (Proceedings of the USENIX, 1997) by Steven H. Rodrigues et al. According to this art, connection of the server and client by a high speed network permits performance improvement and also emulation of some of the socket communication functions by the API of the high speed network enables an effective use of existing software assets. Regarding this emulation, it is well known that the original function can be replaced by a new function through UNIX's rename capability.

SUMMARY OF THE INVENTION

As shown in FIG. 2, one of the endpoints (a socket 221 in a TCP/IP module 220) in socket communication is held by the process on the server (host 210) and the other (a socket 271 in a TCP/IP module 270) by the process on the client (host 260).

When the child process 213 is created by the fork on the server, the socket attributes held by the parent process are copied into the child process, which makes it possible for the parent and child processes to share and use the same socket 221. This means that the child process 213 created by the fork can communicate with the client via a network 2 as it is.

Figure 3:
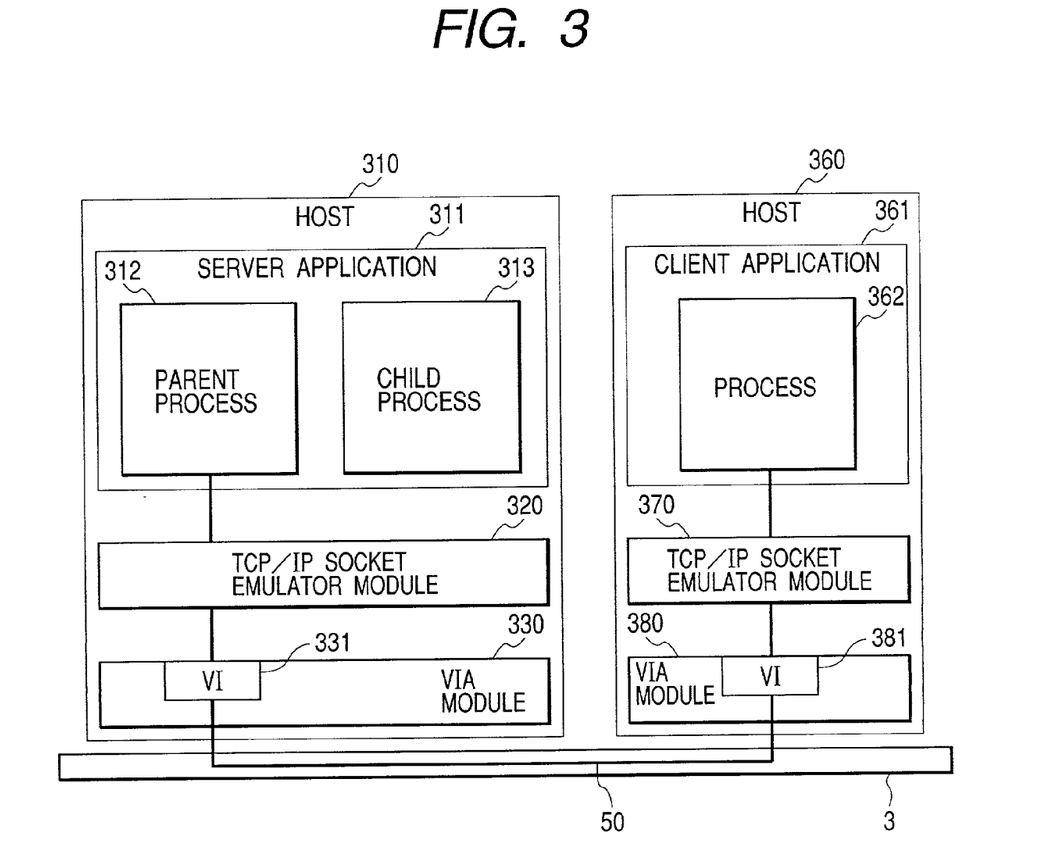
FIG. 3 is a block diagram showing communication in a server-client system which performs communication by direct data transfer between user-spaces.

However, as shown in FIG. 3, in case of VIA, virtual interfaces (hereinafter referred to as VI) for communication lines between processes are local resources for the respective processes and even if a child process 313 in the server application 311 in a host 310 is created by the fork, it cannot share a VI 331 in a VIA module 330 for a parent process 312 to connect to a process 362 via a VI 381 in a VIA module 380 in a host 360. The parent process 312 connects to the VIA module 330 through a TCP/IP socket emulator module 320. The process 362 connects to the VIA module 380 through a TCP/IP socket emulator module 370.

Therefore, there is a problem that a child process created by the fork cannot communicate with the client because it cannot establish a new VI connection with the client in addition to a existing VI connection 50 via a network 3. As a consequence, in order to emulate the fork for socket communication in a VIA, VI connection must be established between the created child process 313 and the client application 361 in the host 360.

In some applications, there may be a case that communication is made between the parent process 312 and the process 362 in the client application 361 in the host 360 before establishment of VI connection between the child process 313 and the process 362. In this case, the child process 313 and the process 362 must take over the communication made between the parent process 312 and the process 362 without fail.

The object of the present invention is to provide a method which enables the child process to take over the parent process's communication by making a reconnection to change the VI connection between the server's parent process and the client's process to that between the server's child process and the client's process so as to permit fork emulation.

According to one aspect of the present invention, in a data processing system which allows the process executed by a first data processor and that by a second data processor to communicate with each other through direct data transfer between user-spaces, communication via a first connection between a first process in the first data processor and a second process in the second data processor is taken over by a second connection between a third process in the first data processor and the second process so as to continue the communication. This method is characterized by having:

a first operation of allowing the first process and the second process to intermit communication via the first connection between them;

a second operation of allowing the third process and the second process to newly establish a second connection between them in response to a request from the first process; and a third operation of enabling the second connection to take over the communication from the first connection in response to a request from the first process so as to continue the communication.

The method is also characterized in that the third process is created using a process creating operation.

Further, it is characterized in that the first operation has the following operations:

allowing the first process to issue a request for intermission of data transfer to the second process; and allowing the second process to intermit data transfer to the first process in response to the intermission request and inform the first process of completion of intermission of data transfer after intermission of data transfer has been completed.

According to another aspect of the present invention, in addition to the above-mentioned, the second operation has a function of enabling the second or third process or both the processes to inform the first process of establishment of the second connection.

Also, the second operation is characterized in that a request for the establishment of the second connection is triggered by an expected event which occurs in the first process.

Also, the second operation is characterized in that a request for the establishment of the second connection is triggered by an unexpected event which occurs in the first process.

Also, the third operation is characterized in that the first process has a means for detecting and memorizing occurrence of data reception in that process before the establishment of the second connection.

The data transfer method according to the present invention has a means that, when the first process detects occurrence of data reception in that process before the establishment of the second connection, informs the third process of it.

The data transfer method according to the present invention also has a means that, when the first process detects occurrence of data reception in that process before the establishment of the second connection and informs the third process of it, copies that data from the first process to the third process through cooperation of the first process and the third process.

According to still another aspect of the present invention, the data transfer method is implemented by an emulation library programmed so as to emulate operation for socket communication and communication can be made by executing the emulation library in each of the first data processor and second data processor, without the need for changing the user program for socket communication to be executed by each of the first and second data processors.

BRIEF DESCRIPTION OF THE DRAWINGS

A preferred embodiment of the present invention will be described in detail based on the followings, wherein.

DETAILED DESCRIPTION OF THE PREFERRED EMBODIMENTS

Figure 1:
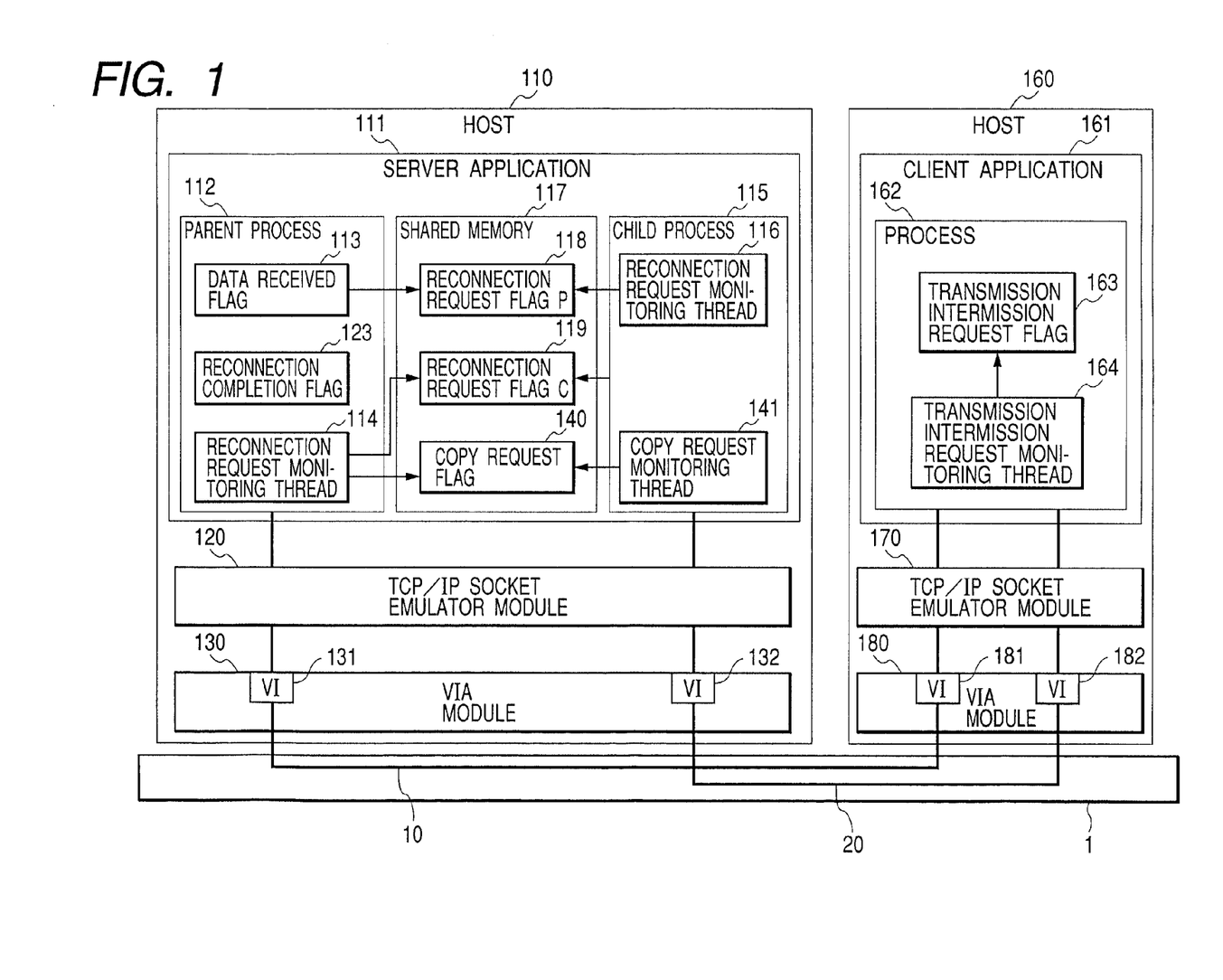
FIG. 1 is a block diagram illustrating a server-client system according to a first embodiment of the present invention.

FIG. 1 shows a server-client system according to an embodiment of the present invention.

As shown in FIG. 1, the memory (not shown) of a host 110 contains a server application 111, a TCP/IP socket emulator module 120, and a VIA module 130. Also, the memory (not shown) of a host 160 contains a client application 161, a TCP/IP socket emulator module 170, and a VIA module 180.

The host 110 and the host 160 are connected by network 1 and the server application 111 and client application 161 communicate with each other via communication lines (10, 20) by transmission/reception of packets.

The TCP/IP socket emulation modules 120 and 170 include function groups as emulations of operation for TCP/IP socket communication by API of VIA; particularly, regarding some function groups as mentioned later, by giving additional operation for embodying the invention to the original operation of the function, the function is emulated.

The VIA modules 130 and 180 include VIA drivers (not shown). The modules also provide endpoints for the VIA communication lines, VIs (131, 132, 181, 182).

In the server application 111, the parent process 112 creates a child process 115 by a function EMU_FORK ( ) as an emulation of a function FORK ( ). The function EMU_FORK ( ) provides, in addition to the operation for creating a child process, an operation for making a shared memory 117 for communication between the parent process 112 and child process 115 and generating a reconnection request flags P 118, C 119 and copy request flag 140 in the shared memory 117. Also the function EMU_FORK ( ) has the following additional operations: an operation for generating a data received flag 113, reconnection completion flag 123, and reconnection request monitoring thread 114 in the parent process 112, and an operation for generating a reconnection request monitoring thread 116 and a copy request monitoring thread 141 in the child process 115. The reconnection request flag P118 is written by the parent process 112, which is monitored by the reconnection request monitoring thread 116. The copy request flag 140 is written by the parent process 112, which is monitored by the copy request monitoring thread 141. The reconnection request flag C 119 is written by the child process 115, which is monitored by the reconnection request monitoring thread 114.

In the client application 161, the process 162 requests the server application 111 to establish a communication line by means of a function EMU_CONNECT ( ) as an emulation of a function CONNECT ( ). The function EMU_CONNECT ( ) additionally has an operation for generating a transmission intermission request flag 163 and a transmission intermission request monitoring thread 164 in the process 162 when permission for connection is given. The transmission intermission request flag 163 is written by a packet sent from the server application 111, which is monitored by the transmission intermission request monitoring thread 164.

Figure 4:
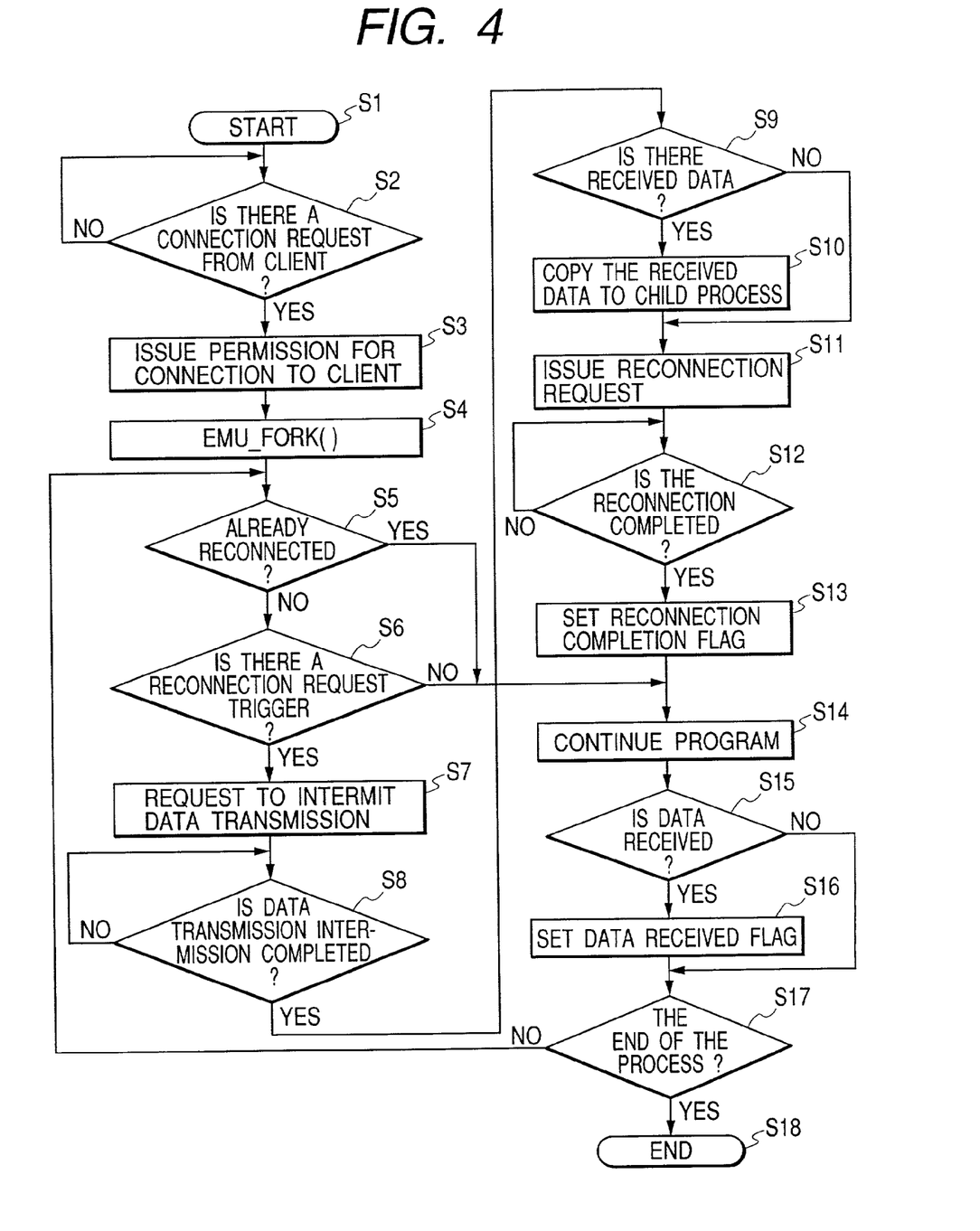
FIG. 4 is a flowchart showing the steps to be taken by the parent process on the server in communication line reconnection according to the above embodiment.
Figure 5:
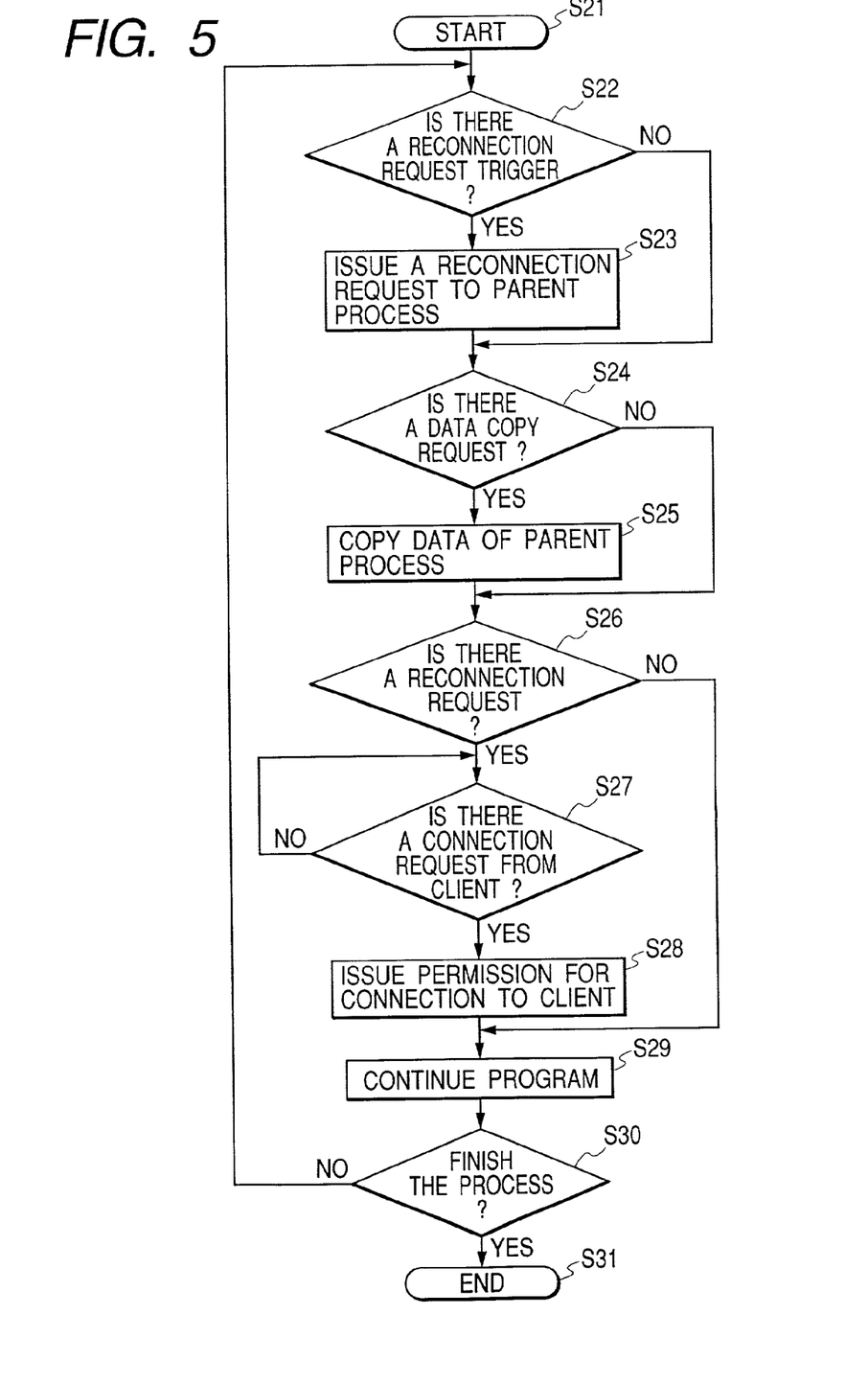
FIG. 5 is a flowchart showing the steps to be taken by the child process on the server in communication line reconnection according to the above embodiment.
Figure 6:
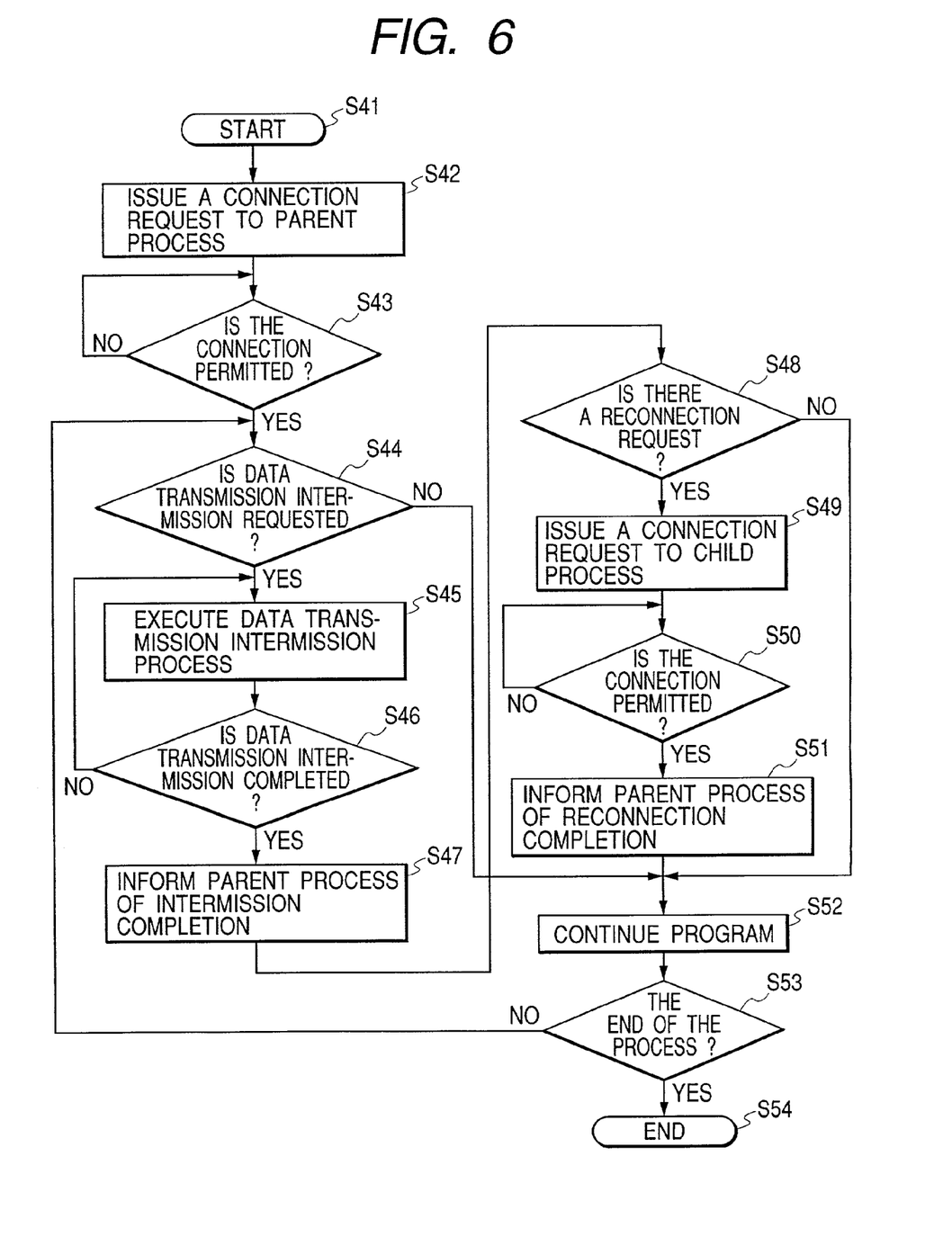
FIG. 6 is a flowchart showing the steps to be taken by the process on the client in communication line reconnection according to the above embodiment.

FIGS. 4, 5, and 6 are flowcharts showing the steps or operational sequences to be taken by the parent process 112, child process 115 and process 162, respectively, according to the present embodiment. Next, the operational sequence for VI reconnection will be detailed referring to the flowcharts.

First, the sequence for the parent process 112 will be explained by reference to the flowchart in FIG. 4.

At step S2, the parent process 112 checks whether there is a connection request from the process 162 in the client application 161. Then, at step S3, it issues permission for connection to the connection request from the process 162. At step S4, a child process is created by a function EMU_FORK ( ). At step S5, the parent process checks whether VI has been already reconnected, by looking at the reconnection completion flag 123. The reconnection completion flag 123 is written at step S13.

If the reconnection has been completed (reconnection completion flag 123 is "1"), the sequence jumps to step 14. If not (reconnection completion flag 123 is "0"), it goes to step S6.

At step S6, the parent process 112 checks whether there is a VI reconnection request trigger in it. At step S4, where the child process has been created, VI reconnection has not been made yet. The reason is as follows: VI reconnection is an expensive process which involves large overheads and the child process once created does not necessarily communicate with the client. Consequently, as shown in FIG. 7, an event which actually triggers communication between the child process 115 and the process 162 is considered as a trigger for starting VI reconnection.

Figure 7:
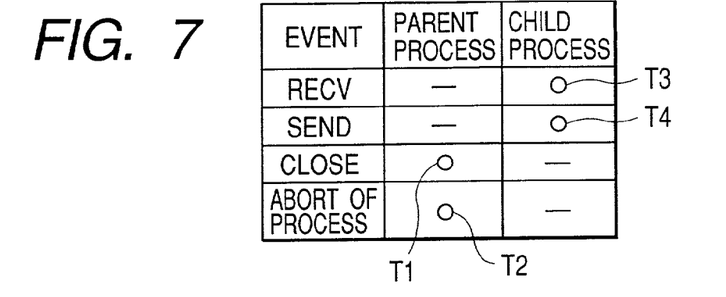
FIG. 7 illustrates an event as a trigger for communication line reconnection.

Trigger T1 in FIG. 7 is a trigger which makes the parent process 112 CLOSE the communication line 10. This trigger is an expected trigger. After closing the communication line 10, it is the child process 115 which the process 162 is to communicate with.

Trigger T2 aborts the parent process 112. This trigger can be an expected or unexpected trigger. After the abortion, the child process 115 must be ready for communication.

Trigger T3 enables the child process 115 to receive data (RECV). This trigger is an expected trigger. The child process 115 must be ready for communication because it expects communication with the process 162. Trigger T4 enables the child process 115 to send data (SEND). This trigger is an expected trigger. The child process 115 must be ready for communication because it is going to send data to the process 162.

Going back to FIG. 4, the operational sequence for the parent process 112 is explained again. At step S6, unless the above-mentioned trigger T1 or trigger T2 emerges, the parent process 112 jumps to step S14 to continue the server program. At step S6, if any of these triggers emerges, the parent process 112 once stops the program under way and goes to steps S7 to S13 as a VI reconnection routine.

At step S7, the parent process 112 requests the process 162 to intermit data transfer. Then, at step S8, it waits for a report of completion of data transmission intermission from the process 162. Upon reception of such report, the parent process goes to step S9, and checks whether communication between the parent process 112 and the process 162 has occurred before the VI reconnection and the parent process 112 has already received data. This check is made by looking at the data received flag 113. The data received flag 113 is written at step S16. If the parent process has already received data (the data received flag 113 is "1"), it goes to step S10. If not (the data received flag 113 is "0"), it goes to step S11.

At step S10, the parent process 112 turns on a copy request flag 140 to inform the child process 115 of presence of data to be copied. After this, the parent process 112 and the child process 115 cooperate so that the address space of the parent process 112 is copied into the child process 115 and thus the child process 115 takes over all the data received by the parent process 112.

At step S11, the parent process issues a request for the child process 115 and process 162 to reconnect the VI. The parent process 112 and the child process 115 communicate with each other via the shared memory 117 and the parent process requests the child process 115 to reconnect the VI by turning on the reconnection request flag P 118.

The parent process 112 communicates with the process 162 via the communication line 10 and sends a VI reconnection request packet to the process 162 and turns on the reconnection request flag 163 to request VI reconnection. At step S12, it waits for a report of completion of reconnection from the process 162.

At step S13, the parent process turns on the reconnection completion flag 123. This prevents issuance of two reconnection requests even if an event which issues a reconnection request trigger occurs later. At step S14, if the parent process is to be reset from the VI reconnection routine, the parent process 112 resumes the program once stopped; otherwise it continues the program.

At step S15, a check is made to see whether the parent process 112 has received data from the process 162 during execution of its program. This procedure is carried out by the function EMU_REDV ( ) as an emulation of RECV ( ). At step S15, if it is found that it has received data, it goes to step S16. If it is found that it has not received data, it goes to step S17.

At step S16, the data received flag 113 is turned on. By doing so, the parent process 112 comes to know that the child process 115 has received data to be copied.

At step S17, a check is made to see whether the parent process 112 should be ended or not according to its program. If it is to be ended, it goes to step S18 to end. If it is not to be ended, it goes back to step S5 and the steps taken so far are repeated.

What we have mentioned above is the operational sequence for the parent process 112.

Next, the sequence for the child process 115 will be explained by reference to the flowchart in FIG. 5.

At step S21, the sequence begins by creating a child process 115 using the function EMU_FORK ( ).

At step S22, the child process 115 checks whether there is a VI reconnection request trigger in itself. At step S22, if there is trigger T3 or trigger T4, it goes to step S23. If there is no such trigger, it jumps to step S26.

At step S23, the child process 115 turns on the reconnection request flag C 119 and informs the parent process 112 of the presence of a reconnection request trigger in the child process 115. The parent process 112 monitors the reconnection request flag C 119 through the thread 114 and recognizes the presence of the trigger.

At step S24, the child process 115 checks whether there is a data copy request from the parent process 112. This check is carried out by the copy request monitoring thread 141 which monitors the copy request flag 140. At step S24, if it is found that there is a data copy request (the copy request flag 140 is "1"), the program which has been executed so far by the child process 115 is once stopped and the sequence goes to step S25. At step S24, if it is found that there is no data copy request (the copy request flag 140 is "0"), it goes to step S26.

At step S25, the address space of the parent process 112 is copied into the child process 115.

At step S26, the child process 115 checks whether there is a VI reconnection request from the parent process 112. This check is carried out by the thread 116 which monitors the reconnection request flag P 118. At step S26, if it is found that there is a reconnection request (the reconnection request flag P 118 is "1"), it proceeds to step S25, a routine for VI reconnection. At step S26, if it is found that there is no reconnection request (the reconnection request flag P 118 is "0"), it jumps to step S29.

At step S27, the child process 115 checks whether there is a connection request from the process 162 in the client application 161.

At step S28, the child process 115 issues permission for connection in response to the connection request from the process 162.

At step S29, when the child process is to be reset from the VI reconnection routine, the child process 115 resumes the program once stopped; otherwise it continues the program.

At step S30, a check is made to see whether the child process 115 should be ended according to its program. If so, it proceeds to step S31 to end. If not, it goes back to step S22 and the steps taken so far are repeated.

What we have mentioned above is the sequence to be followed by the child process 115 for VI reconnection.

Lastly, the operational sequence for the process 162 will be explained by reference to the flowchart in FIG. 6.

The process 162, which is started at step S41, requests the parent process 112 to make VI connection at step S42.

The process 162 waits for permission to be given at step S43.

At step S44, a check is made to see whether there is a data transmission intermission request from the parent process 112. This check is carried out by the transmission intermission request monitoring thread 164 which monitors the transmission intermission request flag 163. If it is found at step S44 that there is such a request (the transmission intermission request flag 163 is "1"), the program which has been executed so far by the process 162 is once stopped and the process goes to step S45. If it is found at step S44 that there is no such request (the transmission intermission request flag 163 is "0"), it jumps to step S52.

At step S45, the process for intermission of data transmission is executed.

At step S46, a check is made to see whether intermission of data transmission has been completed. If it has not been completed, the process 162 goes back to step S45. If it has been completed, the process 162 goes to step S47.

At step S47, the process 162 informs the parent process 112 of completion of data transmission intermission by means of packet transfer.

At step S48, the process 162 checks whether there is a VI reconnection request from the parent process 112. This check is carried out by the thread 164 which monitors the reconnection request flag 163. If it is found at step S48 that there is such a request (the reconnection request flag 163 is "1"), the program which has been executed so far by the process 162 is once stopped and it goes to step S49, a VI reconnection routine. If it is found at step S48 that there is no such request (the reconnection request flag 163 is "0"), it jumps to step S52.

At step S49, the process 162 issues a request for VI connection to the child process 115. Then, at step S50, it waits for permission for VI connection.

As the connection is permitted, the process 162 informs the parent process 112 of completion of VI reconnection at step S51. This information is made by sending a packet for information of reconnection completion to the parent process 112 to turn on the reconnection completion flag 123.

At step S52, if the process 162 is to be reset from the VI reconnection routine, the process 162 resumes the program once stopped; otherwise it continues the program.

At step S53, a check is made to see whether the process 162 should be ended or not according to its program. If so, the process 162 proceeds to step S54 to end. If not, it goes back to step S44 and the steps taken so far are repeated.

What we have mentioned above is the operational sequence to be followed by the process 162 for VI reconnection.

Figure 9:
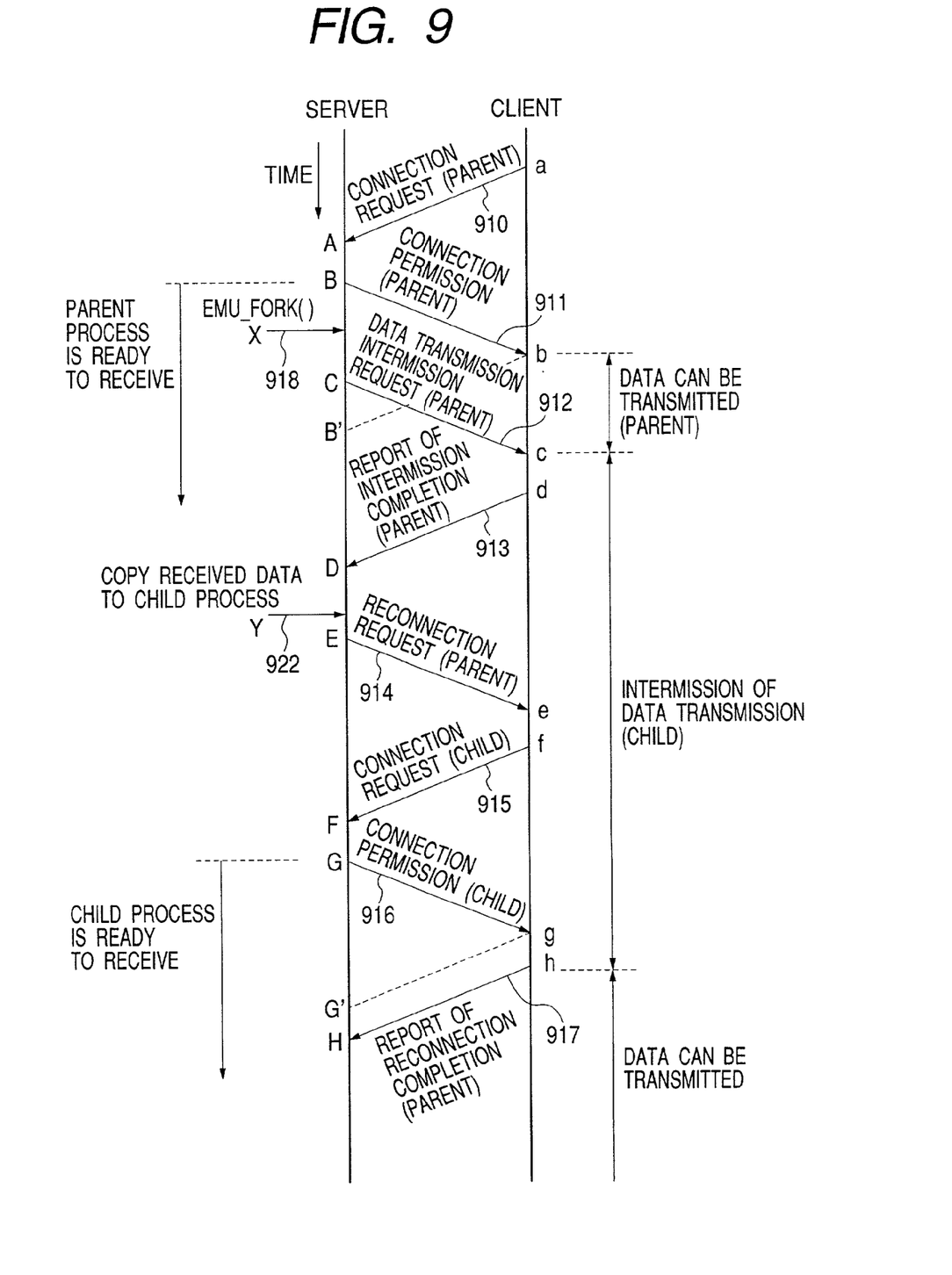
FIG. 9 is a timing diagram showing how the sequence proceeds in communication channel reconnection according to the embodiment.

Referring to the timing diagram in FIG. 9, we will explain how the above-mentioned operational sequences for the parent process 112, child process 115 and process 162 take place in time series in an integrated manner.

First of all, at time a, the client issues a connection request 910 to the parent process on the server, and at time A, the parent process receives it. (In this diagram, the word "parent" in parentheses following the descriptions of various steps indicates that the step concerned takes place between the client and the parent process while the word "child" in parentheses indicates that it takes place between the client and the child process.) Then, at time B, the parent process issues connection permission 911 to the client and at time b, the client receives it. At time X, the parent process creates a child process using a function EMU_FORK ( ) 918. At time C, the parent process issues a data transmission intermission request 912 to the client, and at time c, the client receives it. After time c, the client performs operation for data transmission intermission (not shown in the diagram) and upon completion of the operation at time d, issues a report of completion of data transmission intermission 913 to the parent process. The parent process receives the report 913 at time D and, at time Y after that, makes a copy 922 of received data into the child process. Then, at time E, the parent process issues a reconnection request 914 to the client and at time e, the client receives it. At time f, the client issues a connection request 915 to the child process and at time F, the child process receives it. Then, at time G, the child process issues connection permission 916 to the client and at time g, the client receives it. Lastly, at time h, the client issues a report of completion of reconnection 917 to the parent process, and at time H, the parent process receives it and thus a series of VI reconnection steps are completed.

Here, the parent process is ready to receive data after time B and the child process is ready to receive data after time G. Between time b and time c and after time h, the client is ready to send data, and between time c and time h, data transmission is intermitted. If the client begins sending data at time b, the parent process becomes ready to receive the data at time B'. However, when the parent process receives a report of completion of intermission 913, it comes to know that it will receive no data after time D. Therefore, it is between time B' and time D that the parent process can receive data before VI reconnection; if it receives data during the interval between time B' and time D, it copies the data to the child process. As a result, the child process can take over the communication from the parent process properly after VI reconnection.

Figure 8:
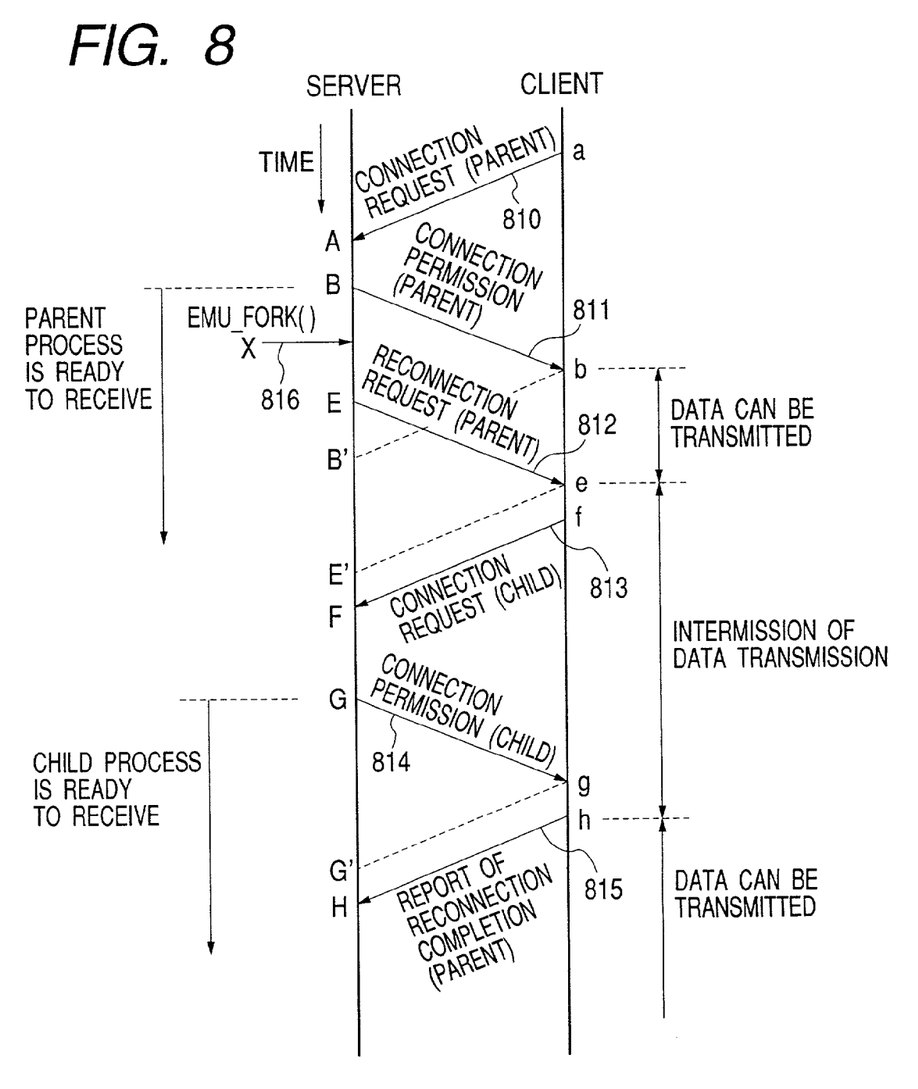
FIG. 8 is a timing diagram showing, for the purpose of comparison with the embodiment, how the sequence proceeds when the parent process on the server does not request the process on the client to intermit data transfer, in communication line reconnection.

FIG. 8 is a timing diagram based on the assumption that data transfer is not stopped. We will clarify the effectiveness of the present invention using FIG. 8.

First, at time a, the client issues a connection request 810 to the parent process on the server, and at time A, the parent process receives it. (In this diagram, the word "parent" in parentheses following the descriptions of various steps indicates that the step concerned takes place between the client and the parent process while the word "child" in parentheses indicates that it takes place between the client and the child process.) Then, at time B, the parent process issues connection permission 811 to the client and at time b, the client receives it. Then, at time E, the parent process issues a reconnection request 812 to the client and at time e, the client receives it. At time f, the client issues a connection request 813 to the child process and at time F, the child process receives it. Then, at time G, the child process issues connection permission 814 to the client and at time g, the client receives it. Lastly, at time h, the client issues a report of completion of reconnection 815 to the parent process, and at time H, the parent process receives it and thus a series of VI reconnection steps are completed.

As in FIG. 9, the parent process is ready to receive data after time B and the child process is ready to receive data after time G. Between time b and time e and after time h, the client is ready to send data, and between time e and time h, data transmission is intermitted. However, the parent process cannot know time E' at which intermission of data transmission by the client is reflected in the server. In other words, the parent process cannot know until when data can be transmitted from the client. Consequently, the parent process can not know when it should copy received data to the child process, which does not ensure that copying is timely done.

In contrast, according to the present embodiment, as explained referring to FIG. 9, the parent process on the server issues a data transmission intermission request to the process on the client, and the client returns a report of intermission completion so that, upon receipt of the report, the parent process knows it should copy received data to the child process. This ensures that communication is continued properly after VI reconnection In the above-mentioned embodiment, a shared memory is used for communication between the processes but it is also possible to use another means such as pipes. Communication between the hosts is implemented by packet transfer but any other means may be used for the communication. In addition, there is no need to separate the first host and the second host physically. This means that obviously the present invention may be applied to processes which are executed on a single data processor.

What is claimed is:

1. A data transfer method for processing system which allows both processes to be executed in a first data processor and in a second data processor to communicate with each other by direct data transfer between user spaces of the data processors, wherein communication via a first virtual interface connection between a first process in the first data processor and a second process in the second data processor is taken over by a second virtual interface connection between a third process in the first data processor and the second process in the second data processor, the method comprising the step of:

setting a flag if the first process receives data which is transmitted via the first virtual interface connection;

issuing, from the first process to the second process, a request for intermission of data transmission to the first process;

intermitting, in the second process, data transmission to the first process and replying from the second process to the first process an acknowledge of the request for intermission of data transmission;

after the acknowledge of the request is received in the first process, copying the data which is received in the first process to the third process;

establishing the second virtual interface connection between the third process and the second process in response to a reconnection request issued from the first process; and taking over the communication from the first virtual interface connection to the second virtual interface connection to continue the communication.

2. The data transfer method as defined in claim 1, wherein said first process issues said reconnection request, after the copying of data to the third process is completed or it is confirmed from said flag that there is no data transmitted via the first virtual interface connection and received in the first process.

3. The data transfer method as defined in claim 1, wherein said first process issues said request for intermission of data transmission to the second process after the third process requests to take over the communication with the second process.

* * * * *

UNITED STATES PATENT AND TRADEMARK OFFICE
CERTIFICATE OF CORRECTION

| | | |
|---|---|---|
| PATENT NO. | : 7,139,832 B2 | Page 1 of 1 |
| APPLICATION NO. | : 09/940506 | |
| DATED | : November 21, 2006 | |
| INVENTOR(S) | : Kameyama et al. | |

It is certified that error appears in the above-identified patent and that said Letters Patent is hereby corrected as shown below:

Title Page,
Item (54):

Please delete "Data Transfer and Intermission Between Parent and Child Process" and     insert --Data Transfer and Intermission Between Parent and Child Processes --

Signed and Sealed this

Thirteenth Day of February, 2007

JON W. DUDAS
*Director of the United States Patent and Trademark Office*